United States Patent
Kim et al.

(10) Patent No.: US 11,563,902 B2
(45) Date of Patent: Jan. 24, 2023

(54) METHOD AND APPARATUS FOR PROVIDING SPECIAL EFFECTS TO VIDEO

(71) Applicant: KAKAO CORP., Jeju-si (KR)

(72) Inventors: Soo Ji Kim, Seongnam-si (KR); Young Wuk Seo, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 35 days.

(21) Appl. No.: 16/861,213

(22) Filed: Apr. 29, 2020

(65) Prior Publication Data

US 2020/0351450 A1  Nov. 5, 2020

(30) Foreign Application Priority Data

Apr. 30, 2019  (KR) ........................ 10-2019-0050862

(51) Int. Cl.
  *H04N 5/262* (2006.01)
  *H04N 5/265* (2006.01)
  *G06V 20/40* (2022.01)

(52) U.S. Cl.
  CPC .......... *H04N 5/2621* (2013.01); *G06V 20/41* (2022.01); *G06V 20/46* (2022.01); *H04N 5/265* (2013.01); *H04N 5/2628* (2013.01)

(58) Field of Classification Search
  CPC .... H04N 5/2621; H04N 5/2628; H04N 5/265; G06K 9/00718; G06K 9/00744
  See application file for complete search history.

(56) References Cited

U.S. PATENT DOCUMENTS

| | | | |
|---|---|---|---|
| 2016/0035323 A1* | 2/2016 | Na | G06F 3/165 715/716 |
| 2018/0300100 A1* | 10/2018 | Snibbe | H04L 67/306 |
| 2020/0304845 A1* | 9/2020 | Kumar | H04N 21/2335 |

FOREIGN PATENT DOCUMENTS

| KR | 1020160015727 A | 2/2016 |
|---|---|---|
| KR | 101894956 B1 | 10/2018 |

* cited by examiner

*Primary Examiner* — Mishawn N. Hunter
(74) *Attorney, Agent, or Firm* — Cantor Colburn LLP

(57) ABSTRACT

A method of providing a special effect includes, in response to the selection of background music to be applied to a video, applying the background music and a special effect associated with the background music to the video based on a first feature extracted from the background music and a second feature extracted from the video.

21 Claims, 5 Drawing Sheets

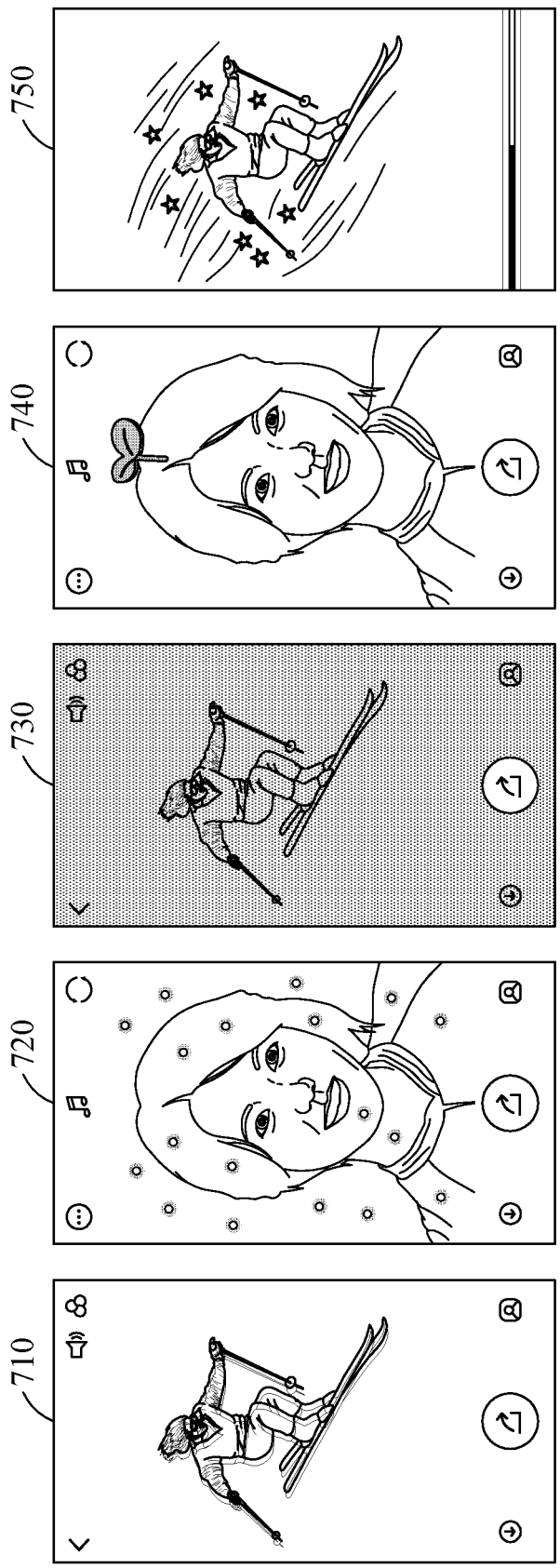

METHOD AND APPARATUS FOR PROVIDING SPECIAL EFFECTS TO VIDEO

CROSS-REFERENCE TO RELATED APPLICATIONS

This application claims the benefit under 35 USC § 119(a) of Korean Patent Application No. 10-2019-0050862 filed on Apr. 30, 2019, in the Korean Intellectual Property Office, the entire disclosure of which is incorporated herein by reference for all purposes.

BACKGROUND

1. Field

The following description relates to a method and apparatus for providing special effects to a video.

2. Description of Related Art

An exploding supply and use of smartphones equipped with video recording and editing functions has generalized shooting a video and displaying the video using a smartphone.

However, when a user shoots a video, an effect set before shooting the video is maintained until the shooting of the single video is finished, or the user needs to directly change the effect at a needed point in time as needed. Thus, it may not be easy for a user who is not familiar with a video shooting function to satisfy his/her desire to create various videos to his/her liking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an example embodiment, there is provided a method of providing a special effect including receiving an input that selects background music to be applied to a video, extracting a first feature from the background music, extracting a second feature from the video, and applying, to the video, the background music and a special effect associated with the background music based on the first feature and the second feature.

The applying may include determining the special effect based on a combination of the first feature and the second feature, and adding the background music and the special effect to the video.

The determining of the special effect may include determining a type of the special effect based on the combination of the first feature and the second feature.

The determining of the special effect may further include determining at least one parameter corresponding to the determined type based on the combination of the first feature and the second feature.

The applying may include obtaining the special effect, adding the background music to the video, and adding the special effect to the video based on the combination of the first feature and the second feature.

The adding of the special effect may include determining at least one of temporal information or spatial information for applying the special effect to the video based on the combination of the first feature and the second feature.

The extracting of the first feature may include extracting an acoustic feature of a time domain from the background music, and extracting an acoustic feature of a frequency domain from the background music by converting the time domain of the background music to the frequency domain of the background music through a fast Fourier transform (FFT).

The first feature may include at least one feature associated with the background music in addition to an acoustic feature of the background music.

The second feature may include at least one of a feature extracted from a foreground of the video, or a feature extracted from a background of the video.

The second feature may include at least one of a feature extracted based on syntactic information of the video, or a feature extracted based on semantic information of the video.

The semantic information may include information associated at least one object detected from the video based on an object detection technique.

The video may include a video that is being shot in real time.

The method may further include reproducing a video to which the background music and the special effect are applied.

The type of the special effect may include at least one of a particle effect, a mosaic effect, a blur effect, a color adjustment effect, a sticker effect, or a zoom effect.

The extracting of the first feature may include determining a genre of the background music by inputting the background music to a pretrained classifier. The applying may include selecting the special effect from a set of one or more special effects determined based on the genre.

The applying may include determining an acoustic special effect to be added to the background music based on at least the second feature of the first feature and the second feature, and determining a scheme for applying the acoustic special effect based on at least the second feature of the first feature and the second feature.

According to another example embodiment, there is provided an apparatus for providing a special effect including at least one processor configured to receive an input that selects background music to be applied to a video, extract a first feature from the background music, extract a second feature from the video, and apply, to the video, the background music and a special effect associated with the background music based on the first feature and the second feature.

The processor may determine the special effect based on a combination of the first feature and the second feature, and add the background music and the special effect to the video.

The processor may obtain the special effect, add the background music to the video, and add the special effect to the video based on a combination of the first feature and the second feature.

The processor may determine at least one of temporal information or spatial information for applying the special effect to the video based on the combination of the first feature and the second feature.

The processor may determine a genre of the background music by inputting the background music to a pretrained classifier, and selecting the special effect from a set of one or more special effects determined based on the genre.

Other features and aspects will be apparent from the following detailed description, the drawings, and the claims.

BRIEF DESCRIPTION OF THE DRAWINGS

FIG. 7 is a diagram illustrating examples of applying a special effect to a video according to an example embodiment.

Figure 1:
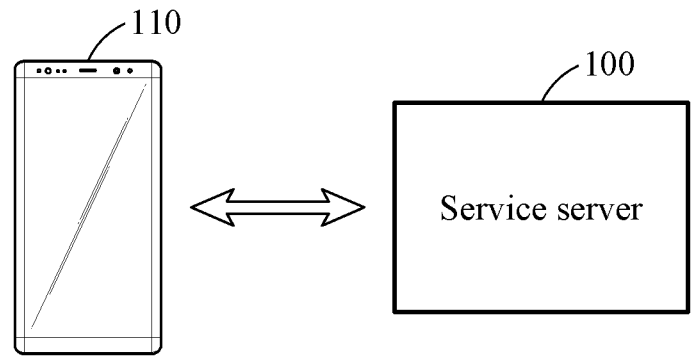
FIG. 1 is a diagram illustrating an example of a network system according to an example embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout this disclosure, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of a network system according to an example embodiment.

Referring to FIG. 1, a network system includes a service server 100 and a user terminal 110. However, a service server and a user terminal which are main subjects of the network system are not limited to the service server 100 and the user terminal 110 illustrated in FIG. 1.

The user terminal 110 may be a mobile terminal or a stationary terminal that is embodied by a computing device. The user terminal 110 may be one of various components of electronic devices, such as, for example, a ultra-mobile personal computer (UMPC), a net-book, a personal digital assistant (PDA), a portable computer, a web tablet, a wireless phone, a mobile phone, a smartphone, a portable game device or console, a navigation device, a black box, a digital camera, and the like. The user terminal 110 may be construed as all types of user device in which a video service-dedicated application (hereinafter simply "video application") associated with the service server 100 is installed and executed. The user device may perform an overall service-related operation, for example, configuration of a service screen, data input, data transmission and reception, and data storage, under the control of the video application. An operation of a user terminal to be described hereinafter may be construed as being performed by the video application.

The service server 100 may be embodied by a computing device configured to provide a command or instruction, a code, a file, a content, a service, and the like by communicating with the user terminal 110 through a network, or by a plurality of such computing devices. The service server 100 may provide a service associated with the video application to the user terminal 110 that executes the video application. For example, the service server 100 may provide, as non-limiting examples, a service of providing background music to be applied to a video, a service for sharing a video to which a special effect is applied. A service to be provided by the service server 100 is not limited to the foregoing examples and may include various services associated with the video application.

A method of communication between the service server 100 and the user terminal 110 may include, as non-limiting examples, a communication method using a communication network (e.g., mobile communication network, wired Internet, wireless Internet, and broadcast network) that is included in the network, and also a near-field communication method used among devices. For example, the network may include at least one of a personal area network (PAN), a local area network (LAN), a campus area network (CAN), a metropolitan area network (MAN), a wide area network (WAN), a broadband network (BBN), or the Internet. In addition, the network may include at least one network topology including, for example, a bus network, a star network, a ring network, a mesh network, a star-bus network, a tree or hierarchical network, and the like. However, the network is not limited to the foregoing examples.

Although to be described in detail hereinafter, the user terminal 110 may provide a method of automatically applying background music and a special effect to a video under the control of the video application. The special effect may visually modify or change an original video, and include a visual image effect. For example, the visual image effect may include synthesizing a virtual object in the original video, or changing an outer shape or appearance, or a color, of an object or a background included in the original video.

According to an example embodiment, the user terminal 110 may automatically apply a special effect to a video based on a feature of background music and a feature of the video, in addition to performing a template-based special effect applying method by which the special effect is determined in advance according to the background music. Through such a special effect applying method, the special effect may be applied based on the feature of the video in addition to the feature of the background music, and thus different special effects may be applied according to visual information of the video even though the same background music is applied.

In addition, the user terminal 110 may automatically apply background music and a special effect to a previously generated video, and even to a video that is being shot or captured in real time while the video is being shot or captured.

The video application may be embodied to be used in a mobile environment in addition to a PC environment. The video application may also be embodied in a form of a program that operates independently, or in a form of in-app of a certain application to perform its operation on the certain application.

Figure 2:
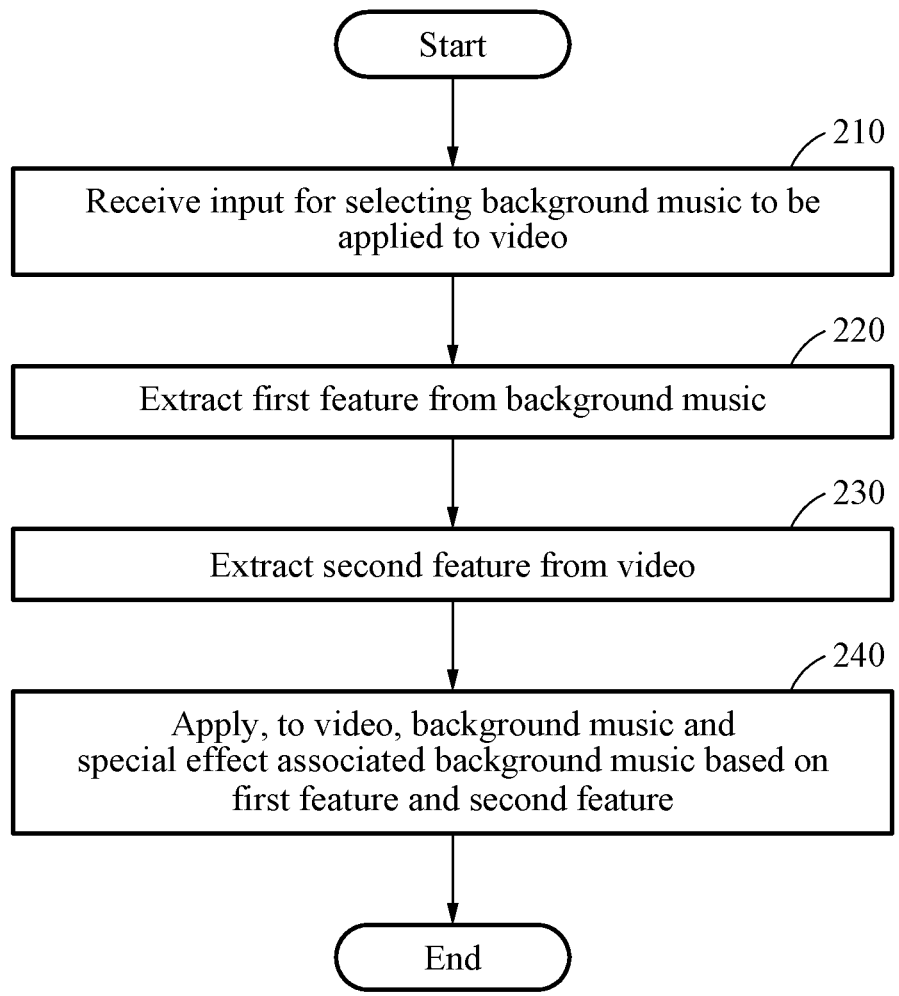
FIG. 2 is a flowchart illustrating an example of a method of providing a special effect according to an example embodiment.

FIG. 2 is a flowchart illustrating an example of a method of providing a special effect according to an example embodiment.

Operations 210 through 240 to be described hereinafter with reference to FIG. 2 may be performed by the user terminal 110 described above with reference to FIG. 1.

Referring to FIG. 2, in operation 210, the user terminal 110 receives, from a user, an input for selecting background music to be applied to a video. According to an example embodiment, the background music may be stored in advance in the user terminal 110 and the user may select the background music from the user terminal 110. Alternatively, the user terminal 110 may receive a background music list provided by the service server 100 (hereinafter simply "the server 100") and the user may select the background music to be applied to the video from the received background music list. Alternatively, when the video is being shot or captured, the user may select, as the background music, sound recorded while the video is being shot or captured.

In operation 220, the user terminal 110 extracts a first feature from the background music. The first feature may include an acoustic feature, or an auditory feature, of the background music. The acoustic feature used herein may indicate intrinsic information of sound of the background music, and include a feature of sound included in the background music (e.g., sound pitch, sound loudness, and a tone), a type of a musical instrument included in the background music, or a type of sound included in the background music (e.g., human sound, animal sound, and machine sound). Alternatively, the first feature may be another feature associated with the background music in addition to the acoustic feature, and include a genre of the background music (e.g., ballad, rock, and others), a feature of a lyric of the background music (e.g., season, love, and others), and a feature of the user selecting the background music (e.g., gender, residence or nationality, and age).

The acoustic feature may be classified into a time-domain acoustic feature and a frequency-domain acoustic feature.

The time-domain acoustic feature may include rhythm information and melody information of the background music. The rhythm information may indicate information associated with beat or tempo of the background music. The melody information may indicate information associated with a change in sound such as a pattern of an ascending musical note or a descending musical note in a connection between successive musical notes.

The frequency-domain acoustic feature may indicate frequency-domain information obtained through a fast Fourier transform (FFT). The frequency-domain information may include a frequency spectrum obtained through the FFT, and the frequency spectrum may include amplitude information corresponding to each frequency band. For example, using a preset time window, it is possible to convert time-domain data included in a corresponding window of the background music to the frequency spectrum.

In operation 230, the user terminal 110 extracts a second feature from the video. The second feature may include a visual feature of the video. The visual feature used herein may indicate visual information included in a scene of the video. Herein, the video may be a set of a plurality of scenes.

The visual feature may include a feature extracted from a foreground of the video and a feature extracted from a background of the video. The foreground may be a portion which may be a target to be recognized in a scene having two regions connected to a boundary line of the video, and the background may be a remaining portion other than the portion corresponding to the foreground. For example, the foreground may be an object which may be a target to be shot or captured for the video, for example, a significant subject for the shooting or capturing (e.g., human being, animal, vehicle, and others). The background may be the remaining portion other than the object.

The feature extracted from the foreground may include visual information associated with a region recognized as the foreground, for example, a pixel value of each of pixels included in the region recognized as the foreground, or feature information extracted from the pixel values. Similarly, the feature extracted from the background may include visual information of a region recognized as the background, for example, a pixel value of each of pixels included in the region recognized as the background, or feature information extracted from the pixel values.

The example of classifying the video into the foreground and the background has been described above for the convenience of description. However, a method of extracting visual information from the video may change in various ways, for example, by classifying the video into a near view, a middle view, and a remote view.

According to an example embodiment, the visual feature may include syntactic information of the video and semantic information of the video.

The syntactic information of the video may indicate form-related information included in a scene of the video and include, for example, color information and light and shade information of the scene. The semantic information of the video may indicate signification-related information included in a scene of the video and include, for example, situation recognition information and/or object recognition information of the scene. The object recognition information corresponding to the semantic information may be generated based on an object detection technique that detects a type of an object (e.g., a class indicating a human being, an animal, a vehicle, and the like) and a position of the object (e.g., a bounding box).

According to examples, the syntactic information and the semantic information may be extracted by distinguishing the foreground and the background. For example, the object recognition information may be extracted from the video based on the syntactic information of the foreground, and overall color information of a scene may be extracted based on the semantic information of the background.

In operation 240, the user terminal 110 applies, to the video, the background music and a special effect associated with the background music based on the first feature and the second feature.

For example, the user terminal 110 may determine the special effect based on a combination of the first feature extracted from the background music and the second feature extracted from the video. A method of determining the special effect will be described hereinafter in detail with reference to FIG. 3. Alternatively, the user terminal 110 may apply the special effect to the video based on the combination of the first feature extracted from the background music and the second feature extracted from the video. A method of determining a special effect applying scheme will be described hereinafter in detail with reference to FIG. 4.

According to an example embodiment, when the object recognition information is extracted from the video, the special effect may change based on the number of recognized objects. For example, when the number of the objects increases, the special effect to be applied may change. Alternatively, the special effect or the special effect applying scheme may change based on a change in movement, position, and/or color of a recognized object, for example.

According to an example embodiment, an acoustic special effect to be applied to the background music may be determined based on the second feature extracted from the video. For example, scene recognition information of the video may be extracted as the second feature, and a tempo of the background music may be automatically adjusted based on the extracted scene recognition information.

Alternatively, the acoustic special effect to be applied to the background music may be determined based on the combination of the first feature extracted from the background music and the second feature extracted from the video. For example, the object recognition information of the video may be extracted as the second feature, a genre of the background music may be extracted as the first feature, and then a musical instrument to be used for the acoustic special effect may be determined based on a combination of the extracted object recognition information and the extracted genre. In this example, the acoustic special effect may be applied as a sound of the determined musical instrument.

Alternatively, a scheme for applying the acoustic special effect may be determined based on the second feature, or the combination of the first feature and the second feature. For example, a point in time at which the acoustic special effect is to be applied, or an intensity of the acoustic special effect may be determined to be used for the scheme.

The user terminal 110 may then reproduce or play the video to which the background music and the special effect are applied.

Although the foregoing operations are described as being performed by the user terminal 110 in FIG. 2, at least a portion of the operations may be implemented to be performed by the server 100. For example, in operation 210, the user terminal 110 may transmit, to the server 100, the input for selecting the background music. Subsequently, operations 220 and 230 may be performed by the server 100, and then the background music and the extracted features may be transmitted to the user terminal 110. Alternatively, the operations up to operation 240 may be performed by the server 100, and then a final video may be transmitted to the user terminal 110.

Figure 3:
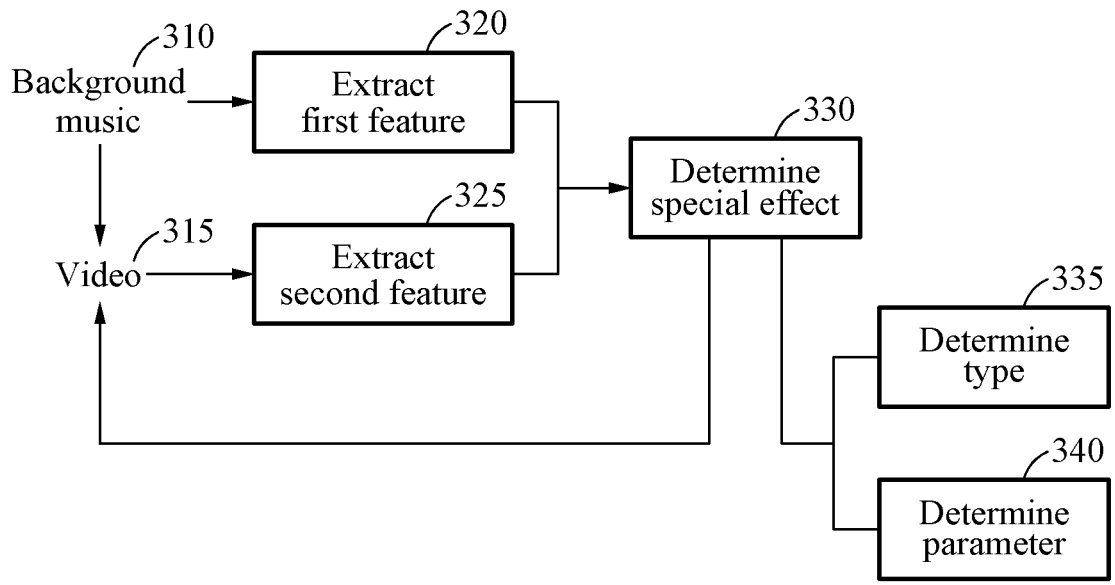
FIG. 3 is a diagram illustrating an example of determining a special effect according to an example embodiment.

FIG. 3 is a diagram illustrating an example of determining a special effect according to an example embodiment.

Referring to FIG. 3, the user terminal 110 may determine a special effect in operation 330 based on a combination of a first feature extracted from background music 310 in operation 320 and a second feature extracted from a video 315 in operation 325.

The special effect may be determined based on the combination of the first feature and the second feature. Thus, even though the same background music is applied, different special effects may be determined based on a video. In addition, even in a case of the same video, different special effects may be determined based on background music.

Operation 330 of determining the special effect may include operation 335 of determining a type of the special effect and operation 340 of determining a at least one parameter corresponding to the determined type.

In detail, in operation 335, the user terminal 110 may determine the type of the special effect based on the combination of the first feature and the second feature. The type of the special effect may include at least one of a particle effect, a mosaic effect, a blur effect, a color adjustment effect, a sticker effect, or a zoom effect (e.g., zoom-in or zoom-out effect). For example, when a frequency of background music corresponds to a preset frequency band and an object is recognized from a foreground of a video, the blur effect may be determined to be the type of the special effect. However, the type of the special effect is not limited to the foregoing examples, and various other types of special effect may be applied.

In operation 340, the user terminal 110 may determine the at least one parameter corresponding to the determined type of the special effect based on the combination of the first feature and the second feature. The parameter of the special effect may be an element or component that forms the special effect, for example, a color, a size, a frequency, a direction, and a speed. For example, when the blur effect is determined to be the type of the special effect, a size or a speed of the blur effect may be determined in proportion to size information of a frequency band. In this example, when a size of the frequency band in the background music increases, a size of a region to be blurred may increase. In contrast, when the size of the frequency band decreases, the size of the region to be blurred may decrease.

The user terminal 110 may apply, to the video 315, the special effect determined in operation 330 while applying the background music 310 to the video 315.

Figure 4:
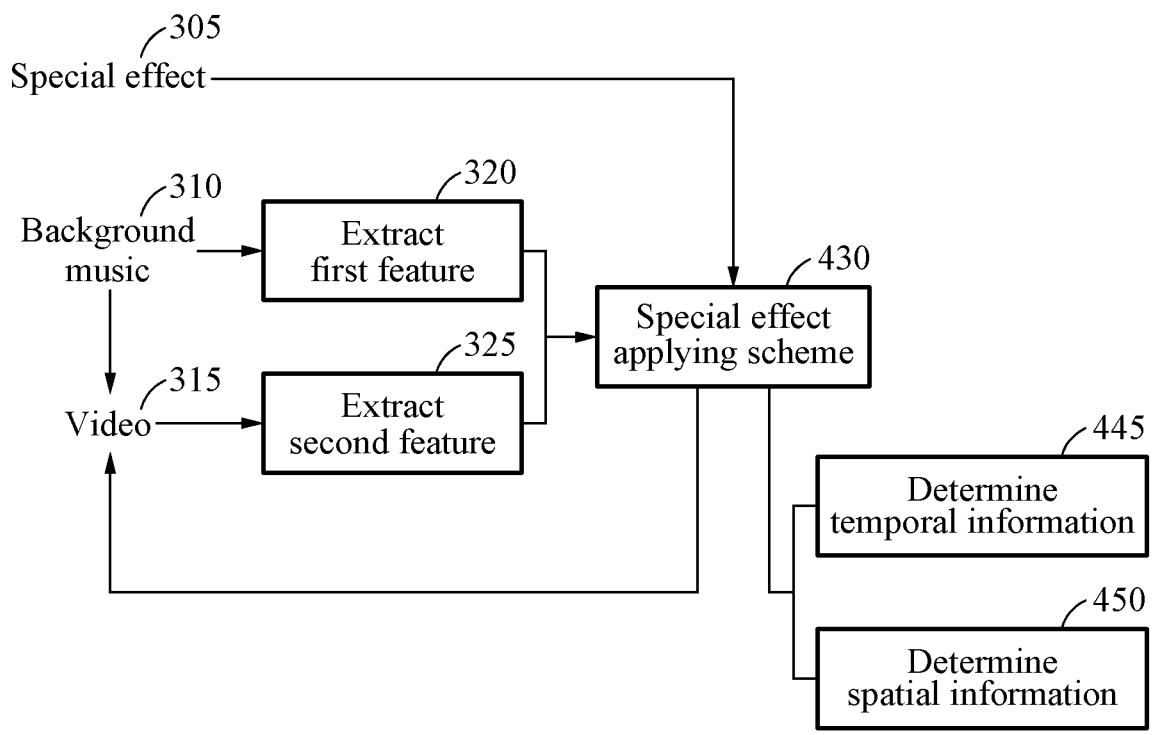
FIG. 4 is a diagram illustrating an example of determining a special effect applying scheme according to an example embodiment.

FIG. 4 is a diagram illustrating an example of determining a special effect applying scheme according to an example embodiment.

Referring to FIG. 4, the user terminal 110 may determine a special effect applying scheme 430 based on a combination of a first feature extracted from background music 310 in operation 320 and a second feature extracted from a video 315 in operation 325. The special effect applying scheme 430 may include temporal information determined in operation 445 and/or spatial information determined in operation 450 for applying a special effect 305 to the video 315. The temporal information may include information associated with a point in time at which the special effect 305 is applied to the video 315. The spatial information may include information associated with a position or a region at which the special effect 305 is applied to the video 315. In the example of FIG. 4, the special effect 305 may be determined as described above with reference to FIG. 3, or may be matched to the background music 310 and thereby determined in advance.

The special effect applying scheme 430 may be determined based on the combination of the first feature and the second feature. Thus, even though the same background music is applied, the point in time or the position at which the special effect 305 is applied may change according to a video. Similarly, even in the case of the same video, the point in time or the position at which the special effect 305 is applied may change according to background music. Thus, it is possible to generate more various video contents.

Hereinafter, a method of determining at least one of the temporal information or the spatial information that is included in the special effect applying scheme 430 will be described in detail with reference to FIG. 5.

The user terminal 110 may apply, to the video 315, the special effect 305 according to the special effect applying scheme 430 while applying the background music 310 to the video 315.

Figure 5:
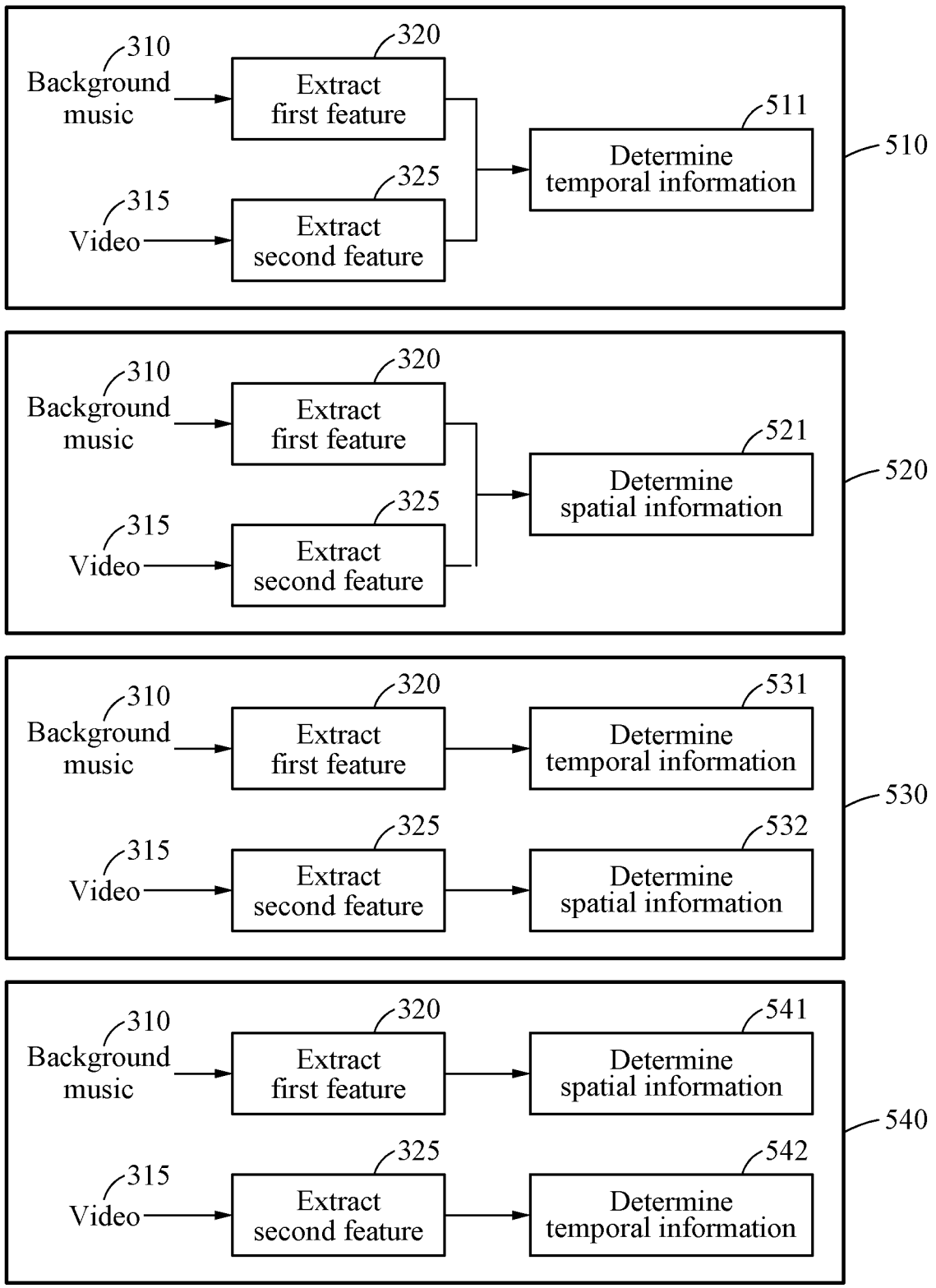
FIG. 5 is a diagram illustrating examples of determining at least one of temporal information or spatial information to apply a special effect to a video according to an example embodiment.

FIG. 5 is a diagram illustrating examples of determining at least one of temporal information or spatial information to apply a special effect to a video according to an example embodiment.

Referring to FIG. 5, the user terminal 110 may determine at least one of temporal information or spatial information for applying a special effect to a video, based on a combination of a first feature and a second feature.

Referring to example 510, the user terminal 110 may determine temporal information 511 based on a combination of a first feature 320 extracted from background music 310 and a second feature 325 extracted from a video 315. For example, the user terminal 110 may apply a special effect to a video at a point in time at which a frequency of background music corresponds to a preset frequency band and an object in a foreground of the video is recognized.

Referring to example 520, the user terminal 110 may determine spatial information 521 based on a combination of a first feature 320 extracted from background music 310 and a second feature 325 extracted from a video 315. For example, when a frequency of background music corresponds to a preset frequency band and an object is recognized from a foreground of a video, the user terminal 110 may apply a special effect to a position of the recognized object.

Referring to example 530, the user terminal 110 may determine temporal information 531 based on a first feature 320 extracted from background music 310, and determine spatial information 532 based on a second feature 325 extracted from a video 315. For example, the user terminal 110 may apply a special effect to a video at a point in time at which a frequency of background music corresponds to a preset frequency band. In this example, when an object is recognized from a foreground of the video, the user terminal 110 may apply the special effect to a position of the recognized object.

Referring to example 540, the user terminal 110 may determine spatial information 541 based on a first feature 320 extracted from background music 310, and determine temporal information 542 based on a second feature 325 extracted from a video 315. For example, when a frequency of background music corresponds to a preset frequency band, the user terminal 110 may apply a special effect to a preset position. In this example, the user terminal 110 may apply the special effect to a video at a point in time at which an object is recognized from a foreground of the video.

Figure 6:
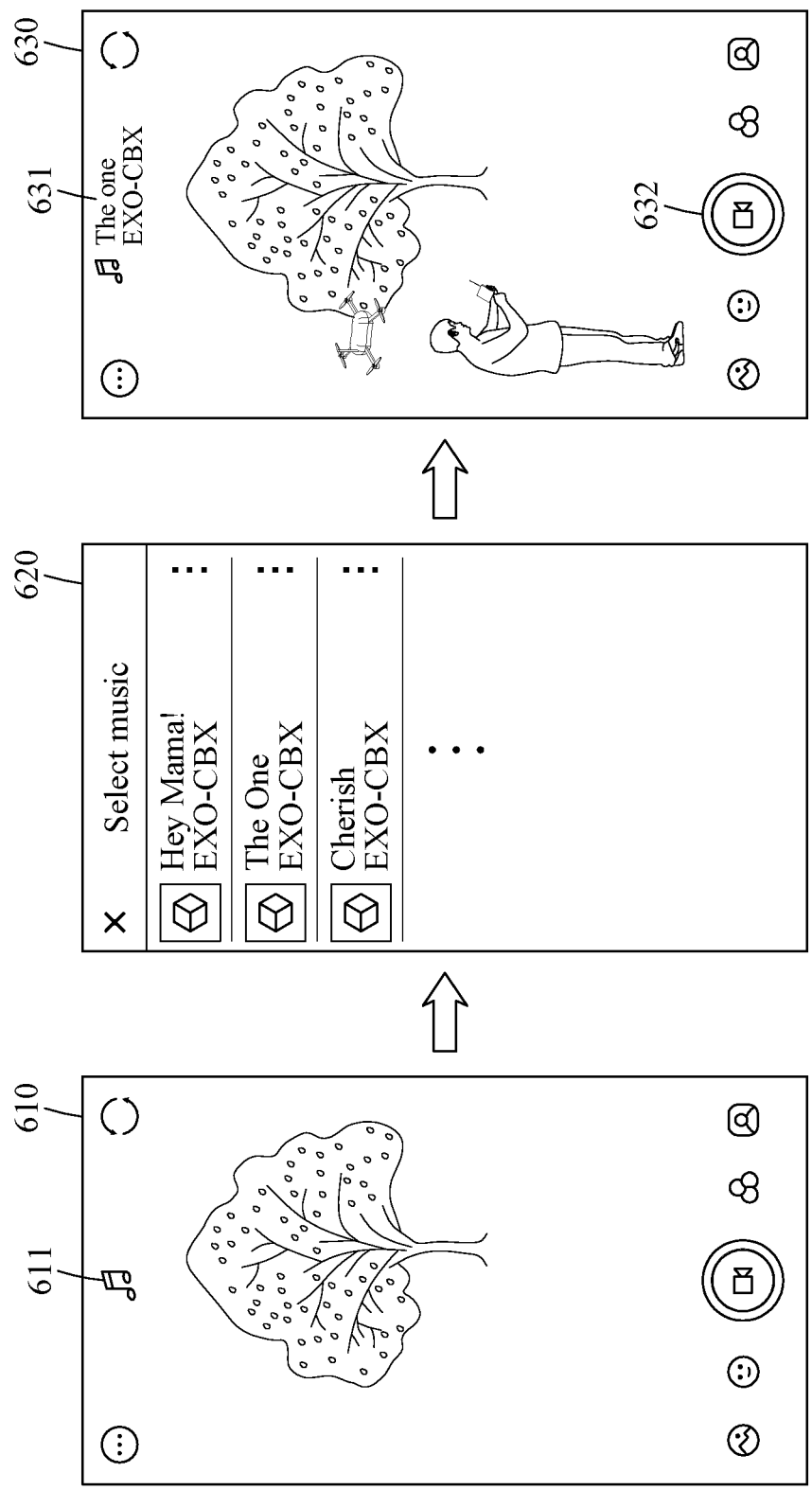
FIG. 6 is a diagram illustrating examples of screens of a video application according to an example embodiment.

FIG. 6 is a diagram illustrating examples of screens of a video application according to an example embodiment.

Referring to FIG. 6, the user terminal 110 may perform an overall operation for a service, for example, configuration of a service screen, data input, data transmission and reception, and data storage, under the control of a video application. The video application may provide an operation of automatically applying background music and a special effect to a video in real time while the video is being shot or captured.

A shooting mode screen 610 of the video application may include a music icon 611. For example, the music icon 611 may be depicted as a musical note, and positioned at a center of an upper end of the shooting mode screen 610. When the music icon 611 is selected, a music select screen 620 that provides a background music list of entries of background music to be applied to a video may be provided.

The background music list may be provided in a form that provides a thumbnail, a title, and artist information for each of the entries. The thumbnail may include a form of a video. Although not illustrated, the music select screen 620 may include a search icon that provides a function of searching for background music.

The screen select screen 620 may provide the background music list stored in advance in the user terminal 110.

Alternatively, the server 100 may provide a background music list to the music select screen 620. When the server 100 provides the background music list, the background music list may be provided for each music genre or entries in the background music list may be arranged in order of popularity.

Alternatively, the music select screen 620 may provide both a first background music list stored in advance in the user terminal 110 and a second background music list provided by the server 100. For example, the music select screen 620 may divide an area providing the first background music list and an area providing the second background music list. In this example, the music select screen 620 may provide the first background music list in an upper end area thereof, and the second background music in a lower end area thereof.

When the background music is selected, a video shoot mode screen 630 to which the background music is applied may be provided. The video shoot mode screen 630 may include a background music information area 631 and a shooting icon 632. The background music information area 631 may provide a musical note icon, and a title and artist information of the selected background music. When the shooting icon 632 is selected, a video may be shot or captured with the background music and the special effect being applied thereto.

FIG. 7 is a diagram illustrating examples of applying a special effect to a video according to an example embodiment.

Referring to example 710, a blur effect may be applied to a video. For example, when a frequency of background music corresponds to a preset frequency band and an object, for example, a person, is recognized from a foreground of the video, the blur effect may be determined to be a type of a special effect. In addition, when the blur effect is determined to be the type of the special effect, a size or a speed of the blur effect may be determined in proportion to size information of the frequency band. The blur effect may be applied at a point in time at which the frequency of the background music corresponds to the frequency band, and applied to an area of the recognized person.

Referring to example 720, a snow falling effect may be applied to a video. For example, when a melody of background music corresponds to a melody of a preset pattern, and a female person is recognized from a foreground of the video, the snow falling effect may be determined to be a type of a special effect. In addition, when the snow falling effect is determined to be the type of the special effect, a snow falling speed may be determined in proportion to size information of the background music. The snow falling effect may be applied at a point in time at which the melody of the background music corresponds to the melody of the preset pattern and the female person is recognized from the foreground of the video.

Referring to example 730, a snow color adjustment effect may be applied to a video. For example, when a rhythm of background music corresponds to a rhythm of a preset pattern, and a rate of a dominant color of the video is greater than or equal to a preset rate, the color adjustment effect may be determined to be a type of a special effect. In addition, when the color adjustment effect is determined to be the type of the special effect, a brightness value of the color adjustment effect may be determined in proportion to the rate of the dominant color. The color adjustment effect may be applied at a point in time at which the rhythm of the background music corresponds to the rhythm of the preset pattern and the rate of the dominant color of the video is greater than or equal to the preset rate.

Referring to example 740, a sticker effect may be applied to a video. For example, when a frequency of background music corresponds to a preset frequency band and a person is recognized from a foreground of the video, the sticker effect may be determined to be a type of a special effect. In addition, when the sticker effect is determined to be the type of the special effect, a shape of the sticker effect may be determined in proportion to size information of the frequency band. For example, when a size is less than a threshold value, a shape of a sprout growing from a bud may be determined. In contrast, when the size is greater than or equal to the threshold value, a shape of a plant growing may be determined. The determined sticker effect may be applied at a point in time at which the frequency of the background music corresponds to the preset frequency band, and applied to an area of the recognized person.

Referring to example 750, a particle effect may be applied to a video. For example, when a melody of background music corresponds to a melody of a preset pattern and a moving object is recognized from the video, the particle effect may be determined to be a type of a special effect. In addition, when the particle effect is determined to be the type of the special effect, a size of particles to be applied may be determined in proportion to size information of sound of the background music. The particle effect may be applied at a point in time at which the melody of the background music corresponds to the melody of the preset pattern, and applied only to an area of the recognized moving object.

Although not illustrated, according to an example embodiment, the user terminal 110 may determine a genre of background music by inputting the background music to a pretrained classifier. When the genre is determined, the user terminal 110 may select a special effect from a set of one or more special effects determined based on the genre. By providing separately a set of special effects suitable for each genre, it is possible to generate more natural and various videos.

According to an example embodiment, an apparatus for providing a special effect may include a processor configured to receive an input that selects background music to be applied to a video, extract an acoustic feature from the background music, extract a visual feature from the video, and apply, to the video, the background music and a special effect associated with the background music based on the acoustic feature and the visual feature.

In detail, the processor may determine the special effect based on a combination of the acoustic feature and the visual feature, add an acoustic effect to the video based on the background music, and add a visual effect to the video based on the special effect. The processor may obtain the special effect, add the acoustic effect to the video based on the background music, and add the visual effect based on the combination of the acoustic feature and the visual feature. The processor may determine at least one of temporal information or spatial information for applying the special effect to the video based on the combination of the acoustic feature and the visual feature. The processor may determine a genre of the background music by inputting the background music to a pretrained classifier, and select the special effect from a set of special effects determined based on the genre.

According to example embodiments described herein, it is possible to increase a quality of a video and provide various user experiences by automatically applying background music and a special effect to the video. For example, the special effect may be applied to the video based on an acoustic feature of the background music and a visual feature of the video. In addition, the background music and the special effect may be automatically applied to the video in real time even while the video is being shot or captured.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of providing a special effect, comprising:
   receiving an input that selects background music to be applied to a video;
   extracting a first feature from the background music;
   extracting a second feature from the video;
   determining a special effect associated with the background music based on a combination of the first feature and the second feature; and
   applying, to the video, the background music and the special effect;
   wherein the applying comprises determining temporal information including information associated with a point in time at which the special effect is applied to the video, based on the at least one of the first feature and the second feature.

2. The method of claim 1, wherein the determining of the special effect comprises:
   determining a type of the special effect based on the combination of the first feature and the second feature.

3. The method of claim 2, wherein the determining of the special effect further comprises:
   determining at least one parameter corresponding to the determined type based on the combination of the first feature and the second feature.

4. The method of claim 2, wherein the type of the special effect includes at least one of a particle effect, a mosaic effect, a blur effect, a color adjustment effect, a sticker effect, or a zoom effect.

5. The method of claim 1, wherein the applying further comprises:
   obtaining the special effect;
   adding the background music to the video; and
   adding the special effect to the video based on the at least one of the first feature and the second feature.

6. The method of claim 5, wherein the adding of the special effect comprises:
   determining spatial information for applying the special effect to the video based on the at least one of the first feature and the second feature.

7. The method of claim 1, wherein the extracting of the first feature comprises:
   extracting an acoustic feature of a time domain from the background music; and
   extracting an acoustic feature of a frequency domain from the background music by converting the time domain of the background music to the frequency domain of the background music through a fast Fourier transform (FFT).

8. The method of claim 1, wherein the first feature includes at least one feature associated with the background music in addition to an acoustic feature of the background music.

9. The method of claim 1, wherein the second feature includes at least one of:
   a feature extracted from a foreground of the video; or
   a feature extracted from a background of the video.

10. The method of claim 1, wherein the second feature includes at least one of:
    a feature extracted based on syntactic information of the video including form-related information included in a scene of the video; or a feature extracted based on semantic information of the video.

11. The method of claim 10, wherein the semantic information includes information associated at least one object detected from the video based on an object detection technique.

12. The method of claim 1, wherein the video includes a video that is being shot in real time.

13. The method of claim 1, further comprising:
reproducing a video to which the background music and the special effect are applied.

14. The method of claim 1, wherein the extracting of the first feature comprises:
determining a genre of the background music by inputting the background music to a pretrained classifier,
wherein the applying comprises:
selecting the special effect from a set of one or more special effects determined based on the genre.

15. A non-transitory computer-readable storage medium storing instructions that, when executed by a processor, cause the processor to perform the method of claim 1.

16. The method of claim 1, wherein the temporal information including the information associated with the point in time at which the special effect is applied to the video is determined based on the second feature extracted from the video.

17. A method of providing an acoustic special effect, comprising:
receiving an input that selects background music to be applied to a video;
extracting a first feature from the background music;
extracting a second feature from the video;
determining an acoustic special effect to be added to the background music based on the second feature extracted from the video;
determining a scheme for applying the acoustic special effect based on the second feature extracted from the video; and
applying, to the background music, the acoustic special effect,
wherein the determining of the acoustic special effect comprises determining the acoustic special effect to be added to the background music based on a combination of the first feature and the second feature, and
the determining of the scheme comprises determining the scheme for applying the acoustic special effect based on the combination of the first feature and the second feature.

18. An apparatus for providing a special effect, comprising:
at least one processor configured to receive an input that selects background music to be applied to a video, extract a first feature from the background music, extract a second feature from the video, determine a special effect associated with the background music based on a combination of the first feature and the second feature, and apply, to the video, the background music and the special effect,
wherein the at least one processor is further configured to determine temporal information including information associated with a point in time at which the special effect is applied to the video, based on the at least one of the first feature and the second feature.

19. The apparatus of claim 18, wherein the processor is configured to:
obtain the special effect;
add the background music to the video; and
add the special effect to the video based on the at least one of the first feature and the second feature.

20. The apparatus of claim 18, wherein the processor is configured to:
determine spatial information for applying the special effect to the video based on the at least one of the first feature and the second feature.

21. The apparatus of claim 18, wherein the processor is configured to:
determine a genre of the background music by inputting the background music to a pretrained classifier and select the special effect from a set of one or more special effects determined based on the genre.

* * * * *